United States Patent Office 2,762,720
Patented Sept. 11, 1956

2,762,720

HEAT-SHRINKABLE PACKAGING MATERIAL AND PROCESS FOR PREPARING SAME

Rudolph H. Michel, Kenmore, N. Y., assignor to E. I. du Pont de Nemours and Company, Wilmington, Del., a corporation of Delaware No Drawing. Application March 18, 1955,
Serial No. 495,348

14 Claims. (Cl. 117—65)

This invention relates to the manufacture of polyethylene terephthalate packaging films. More particularly it relates to the preparation of heat-shrinkable polyethylene terephthalate films suitable for preparing tightly wrapped packages.

Heat-shrinkable films are not new. They have been used for packaging poultry, raw meats, smoked hams, fish, etc.; in general, items of irregular shape wherein the wrapper is shrunk to fit snugly around the item. Heat-shrinkable polyethylene terephthalate films are particularly advantageous in this use because of outstanding transparency, surface gloss, strength and shrinkage force. (Shrinkage force reflects the ability of the film to shrink against a force tending to prevent shrinkage.)

However, heat-shrinkable polyethylene terephthalate films suffer from two drawbacks. First, the films are difficult to heat seal. Under normal conditions the heat-seal bond strength may be as low as 25% of the desired strength for normal use. Attempts to increase this strength by increasing the temperature or time of heat-sealing converts the areas of the films adjacent to the seal to a brittle state. Flexing at the heat-seals then tends to split or crack the film. Secondly, the shrunken films transmit too much water vapor. This is a particular disadvantage when frozen food must be stored for long periods of time.

An object of this invention is to provide a heat-shrinkable polyethylene terephthalate film that is heat-sealable and has a low permeability to water vapor, yet retains the high gloss, transparency, strength, etc., associated with polyethylene terephthalate films. Another object is to specify a process for preparing this novel film. Other objects will appear hereinafter.

The objects are accomplished by providing a heat-shrinkable polyethylene terephthalate film having at least one surface coated with a copolymer obtained by polymerizing at least 80% by weight of vinylidene chloride and up to 20% by weight of at least one other polymerizable mono-olefinic monomer copolymerizable with vinylidene chloride. Preferably, the coating should contain at least 90% vinylidene chloride and the polymerizable mono-olefinic monomer should be an alkyl acrylate.

Coatings containing at least 80% vinylidene chloride were found to adhere strongly to the heat-shrinkable polyethylene terephthalate film. Furthermore, the degree of adherence and the elasticity of the coatings were such as to permit the base film to shrink with substantially no change from the film's original appearance. In other words, the copolymeric coatings having the prescribed composition shrank uniformly with the base polyethylene terephthalate film with no adverse effect on transparency, gloss or surface smoothness of the polyethylene terephthalate film.

Heat-shrinkable polyethylene terephthalate films, as used in this specification, refer to films that have been oriented in one or two mutually perpendicular directions by stretching or rolling or a combination of stretching and rolling. These films are not dimensionally stable and tend to revert to their original dimensions upon exposure to temperatures above about 70° C. For the purpose of this invention, the polyethylene terephthalate base film will shrink at least 10% in one or two mutually perpendicular directions when exposed to a temperature of 100° C. The heat-shrinkable base film is formed by stretching amorphous polyethylene terephthalate film from 2X to as much as 5X or more in one or two directions (where X is the original dimension of the film). Since the film tends to shrink a greater amount in the direction of the second stretch, it may be desirable for some end uses to stretch the film a lesser amount in the second direction. In this way the film may approach a balanced shrinkage condition, i. e., the heat-shrinkable film will shrink to the same degree in both directions. If stretching is to occur in only one direction, it is preferred to stretch the film about 2X.

The invention will be more clearly understood by referring to the examples and discussion which follow. The examples are specific embodiments of the invention, Example 1 setting forth the best mode contemplated for carrying out the process of the invention. The examples are not to be construed in any sense as limitative of the invention. Unless otherwise stated, all percentages in the specification and the claims are by weight.

In the examples, uncoated heat-shrinkable polyethylene terephthalate films are compared to the coated heat-shrinkable polyethylene terephthalate films of this invention. The degree of shrinkage, the heat-seal strength and the water vapor permeability of the film with and without coating were measured and compared. The degree of adhesion of the coating to the polyethylene terephthalate film was also determined. The details of the tests follow:

The degree of shrinkage is measured in both the machine and transverse directions. To measure the degree of shrinkage in the machine direction, a strip of film 1" wide and 6" long is used, the length of the film running in the machine direction. A distance of ten centimeters is marked along the length of the film and two open-mouthed clips are clamped across the width of this film at each end of the ten-centimeter length. The film is then immersed in boiling water and the amount of shrinkage after 5 seconds is noted. For films stretched 3X in both directions, the average shrinkage in the machine direction is about 25%. To test the degree of shrinkage in the transverse direction, a strip of film 1" wide and 4" long is used, the length of film running in the transverse direction. A distance of five centimeters is marked along the transverse direction and the film is clamped at each end of this five-centimeter length. The film is immersed in boiling water for 5 seconds and the shrinkage is noted. For film stretched 3X in the machine direction followed by 3X in the transverse direction, shrinkage in the transverse direction is about 50%.

Heat-seal strength is measured by cutting strips of film

1½" wide by 4" long. The length of these strips runs perpendicular to the "grain" or machine direction of the film. Two strips are then sealed together, the seal running in the transverse direction of the film. An impulse sealer (an electrical-resistance-type bar sealer), manufactured by the Wrap-Ade Machine Co., Inc., Belleville, New Jersey, as model No. 12, is used at a setting of 115 and for a one-second-dwell time. The width of the sealed area is 3/16 of an inch. The seal strength is then measured by placing the free ends of the sealed strips in a Suter testing machine and pulling them apart. The highest force in grams required to pull the strips apart is taken as a measure of the heat-seal strength.

Moisture permeability is determined by placing the test film over the top of an aluminum cup containing 15 millimeters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and re-weighed. The weight loss is converted to grams of water lost per 100 square meters per hour.

Adhesion of the coating to the base film is measured by placing a strip of pressure-sensitive cellulose film tape over the coated film surface and then stripping the cellulose film tape rapidly from the coated film surface. Coatings having excellent adhesion will remain firmly attached to the base film. Coatings having poor adhesion are either partially or wholly stripped from the base film with the pressure-sensitive cellophane tape.

EXAMPLE 1

A base film of polyethylene terephthalate, 0.25 mil thick and stretched 2 times its original dimensions in 2 directions, was coated with a copolymer obtained from 94% vinylidene chloride and 6% methyl acrylate along with 2% (based on the weight of the previous two components) of itaconic acid. The coating was applied as an aqueous dispersion prepared by adding "Duponol" WAQ [1], "Sulframin" AB [2], ammonium persulfate, itaconic acid and water to a vessel fitted with a stirrer and a reflux condenser. After dissolving these components by stirring, vinylidene chloride and methyl acrylate were introduced and the mixture refluxed at 35° C. A solution of metasodium bisulfite was added and the mixture stirred until refluxing ceased, thereby indicating completion of polymerization. About 8 lbs. of "Duponol" WAQ or about 3 lbs. of "Sulframin" AB in water may be added subsequent to polymerization to stabilize the copolymer against coagulation.

The exact quantities used to prepare the coating composition are given below:

| | |
|---|---|
| Water | 120 lbs. |
| "Duponol" WAQ | 10 lbs. |
| Ammonium persulfate | 102 gms. |
| Vinylidene chloride | 141 lbs. |
| Methyl acrylate | 9 lbs. |
| Itaconic acid | 3 lbs. |
| Meta-sodium bisulfite | 51 gms. in 5 lbs. of water. |

Added subsequent to polymerization:
"Sulframin" AB_____ 3 lbs. in 10 lbs. of water.

The polyethylene terephthalate base film was coated by passing it through a bath of the above dispersion. Contact time was sufficient to allow the base film to retain a slight excess of the coating. The excess was removed by doctoring as the coating was made smooth and brought to the desired thickness. The film was dried at a temperature between room temperature and 70° C.

[1] Sodium salt of a fatty alcohol sulfate in aqueous solution (33% active ingredient).
[2] Sodium salt of an alkyl benzene sulfonate.

The resulting heat-shrinkable, coated film retained its original high gloss and transparency. The film was then made to shrink by blowing hot air upon the film, the air being at a temperature between 80°–90° C. The shrunken film was as transparent and glossy as the original film. The adhesion of the coating, both before and after shrinkage, was found to be excellent. The properties of the coated film are compared to those of uncoated film in the following table, Table 1.

*Table 1*

| Film | Degree of Shrinkage, Direction | | Heat-seal Strength (gms./1.5 ins.) | Permeability (gms./100 sq. meters/hr.) | |
|---|---|---|---|---|---|
| | Machine | Transverse | | Before Shrinkage | After Shrinkage |
| Uncoated | Percent 28 | Percent 50 | 125 | 350 | 295 |
| Coated | 24 | 46 | 330 | 200 | 180 |

EXAMPLE 2

A base film of polyethylene terephthalate, 1 mil thick and stretched 3 times its original dimensions in both machine and transverse directions, was coated by dipping into the following solution: 50 parts of a copolymer obtained from 90% vinylidene chloride and 10% acrylonitrile, 80 parts of toluene and 350 parts of methylethylketone. The solution was in a coating trough having a glass rod immersed in the solution and mounted across the trough and separated from the bottom of the trough. The film was conducted into the coating trough and under the glass rod and thereafter between two off-set doctor rolls in the form of glass rods which served to remove excess coating from the film surface. Originally the coating solution was mixed and maintained at about 80° C. to dissolve the polymer. During the coating operation, the coating solution was maintained at a temperature between 65° and 70° C. After dipping into the solution the coated film was dried in air at room temperature and then dried in a hot-air oven at 65° to 70° C. for about 5 minutes.

The coated film retained its strength, its high gloss and its transparency. The adhesion of the coating to the base film was found to be excellent. The remaining properties of the coated film are compared to those of uncoated film in the following table, Table 2.

*Table 2*

| Film | Degree of Shrinkage, Direction | | Heat-seal Strength (gms./1.5 ins.) | Permeability (gms./100 sq. meters/hr.) | |
|---|---|---|---|---|---|
| | Machine | Transverse | | Before Shrinkage | After Shrinkage |
| Uncoated | Percent 29 | Percent 50 | 170 | 151 | 66 |
| Coated | 25 | 40 | 700 | 84 | 42 |

EXAMPLES 3–9

Table 3, which follows, summarizes the remaining examples of this specification. The films were prepared substantially in the manner described for Example 1. The amounts of polymer components were varied to provide the percentages given in the table. Properties of the coated films are compared to an uncoated control film.

Table 3

| Example | Composition of Film [1] | Degree of Shrinkage, Direction | | Heat-seal Strength (gms./1.5 ins.) | Permeability (gms./100 sq. meters/hr.) | |
|---|---|---|---|---|---|---|
| | | Machine | Transverse | | Before Shrinkage | After Shrinkage |
| | | *Percent* | *Percent* | | | |
| Control | Uncoated | 29 | 50 | 170 | 151 | 66 |
| 3 | 90/10 VCl$_2$/VAc | 26 | 46 | 750 | 83 | 44 |
| 4 | 80/10/10 VCl$_2$/AN/VAc | 27 | 46 | 825 | 100 | 48 |
| 5 | 90/10 VCl$_2$/VCl | 26 | 45 | 800 | 81 | 43 |
| 6 | 94/6/2 VCl$_2$/EA/IA | 22 | 40 | 650 | 73 | 39 |
| 7 | 94/6/1 VCl$_2$/MAN/IA | 23 | 39 | 675 | 71 | 38 |
| 8 | 92/8 VCl$_2$/EM | 25 | 44 | 650 | 77 | 42 |
| 9 | 94/6/1 VCl$_2$/MVK/IA | 23 | 43 | 670 | 70 | 36 |

[1] VCl$_2$, vinylidene chloride; VAc, vinyl acetate; AN, acrylonitrile; VCl, vinyl chloride; EA, ethyl acrylate; IA, itaconic acid; MAN, methacrylonitrile; EM, ethyl methacrylate; MVK, methyl vinyl ketone.

While the examples refer to stretching and coating plain polyethylene terephthalate films, the invention is also applicable to modified polyethylene terephthalate films. The polyethylene terephthalate films may be modified with isophthalic acid, bibenzoic acid, sebacic acid, adipic acid or hexahydro-terephthalic acid or esters thereof. The most attractive process from the commercial standpoint for preparing polyethylene terephthalate which can be made into film comprises carrying out an ester interchange between ethylene glycol and dimethyl terephthalate to form bis-2 hydroxy ethyl terephthalate. This compound is then polymerized to polyethylene terephthalate at an elevated temperature and under reduced pressure. The reaction may occur in the presence of 10–15% of a low alkyl ester of one of the above mentioned acids.

Polyethylene terephthalate, modified or unmodified, is then cast as a film in the conventional manner. The process may also be applied to polyethylene terephthalate extruded as tubes. The polyethylene terephthalate structures are made heat-shrinkable by stretching and/or rolling as described previously. The coating step, which is most critical to the present invention, follows.

The coating comprises a copolymer obtained from critical quantities of vinylidene chloride and at least one other polymerizable mono-olefinic monomer copolymerizable with vinylidene chloride; at least 80% by weight of vinylidene chloride and 20% by weight of the copolymerizable monomer(s). Within this range of compositions, the coatings adhere tenaciously to the base film after shrinkage and do not detract from the high transparency and glossiness of the base film. Most important these coatings increase the heat-seal strength and reduce the moisture permeability of the film.

Preferred polymerizable mono-olefinic monomers which may be copolymerized with vinylidene chloride have been illustrated in the examples and include the alkyl acrylates such as methyl and ethyl acrylate, acrylonitrile, vinyl chloride, vinyl acetate, methacrylonitrile, ethyl methacrylate, and methyl vinyl ketone. However, the invention is not limited to these. Any monomer which will copolymerize with vinylidene chloride may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl itaconate, dibutyl itaconate, vinyl pyridine, maleic anhydride, alkyl glycidyl ether and other unsaturated aliphatic ethers described in U. S. Patent 2,160,943. These compounds may be described as vinyl or vinylidene compounds having a single "CH$_2$=C<" group. The most useful ones fall within the general formula

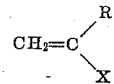

where R may be hydrogen, a halogen or a saturated aliphatic radical and X is selected from one of the following groups: —Cl, —Br, —F, —CN, —C$_6$H$_5$, —COOH

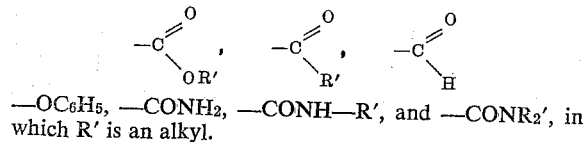

—OC$_6$H$_5$, —CONH$_2$, —CONH—R', and —CONR$_2$', in which R' is an alkyl.

The coating may be applied from aqueous or organic vehicles, i. e., in the form of aqueous dispersions or from solutions of the polymers in organic solvents. From a practical standpoint it is preferred to apply the coatings from solvent solutions rather than aqueous dispersions. The organic solvents are usually evolved more readily than water at temperatures below 70° C. When applying the coating compositions from aqueous dispersions, it is preferred to incorporate unsaturated aliphatic acids such as itaconic acid, acrylic acid or methacrylic acid in the coating compositions. While Examples 1, 6, 7 and 9 illustrate the use of itaconic acid in the coating composition, substantially equivalent quantities of either acrylic acid or methacrylic acid used in place of itaconic acid produce similar results. The acid may be omitted if steps are taken to facilitate wetting of the film by using commercial wetting agents or other methods. However, films coated from aqueous dispersions that do not contain the unsaturated aliphatic acids are somewhat inferior in the degree of transparency.

The coating may be applied in accordance with any known coating technique. It may be applied by passing the base film through a bath containing the coating composition, in a continuous manner or in a batch manner. The coating may also be sprayed on the film, or applied manually by brushing or the like. The temperature of the coating composition when applied should not exceed about 70° C. and the coated film should be dried below 70° C. Higher temperatures tend to promote incipient film shrinkage.

The thickness of the coating may range from 0.1 mil to 10 mils. A coating thickness of 0.1–0.5 mil is preferred to minimize the effect of the coating on subsequent shrinking.

The coated heat-shrinkable films of this invention may be fabricated into sheets, envelopes or tubes, depending on the particular end use. Normally, the film is formed into a bag open at one end; the article to be wrapped is placed into the bag; and the bag is sealed. The bag is then exposed to a temperature of 70° C.–100° C. for example, by immersion in hot water, to shrink the bag around the article.

The films are of greatest utility in the field of food packaging, particularly packaging frozen foods such as poultry, fruits and vegetables, which are to be stored for extended periods of time. Some frozen vegetables may be cooked directly in the film package without any adverse effect on the film or the vegetables. The film may also be used to wrap hardware items, greased or untreated machine parts and other materials which must be kept free from moisture. Multiple packages, for example for wrapping individual servings of loose food products such as crackers, nuts, cereals, etc., are another use for the film. Sheets or tubes of the coated, heat-shrinkable film may be used in bundling applications for holding together several packages of cigarettes, small boxes of cereals, crackers, etc.

While the invention contemplates the use of the copolymers as the essential constituents of the coatings, other ingredients may be added. The addition of pigments, dyes, delustrants, plasticizers, etc., is therefore understood to be within the purview of this invention.

As many widely different embodiments may be made without departing from the spirit and scope of this invention, it is understood that the invention is not limited except as defined in the appended claims.

What is claimed is:

1. A heat-shrinkable polyethylene terephthalate film having at least one surface coated with a copolymer obtained from at least 80% by weight of vinylidene chloride and up to 20% by weight of at least one other polymerizable mono-olefinic monomer copolymerizable therewith.

2. A heat-shrinkable polyethylene terephthalate film as in claim 1 wherein the mono-olefinic monomer is an alkyl acrylate.

3. A heat-shrinkable polyethylene terephthalate film as in claim 1 wherein the mono-olefinic monomer is methyl acrylate.

4. A heat-shrinkable polyethylene terephthalate film having at least one surface coated with a copolymer obtained from at least 90% by weight of vinylidene chloride and up to 10% by weight of at least one other polymerizable mono-olefinic monomer copolymerizable therewith.

5. A heat-shrinkable polyethylene terephthalate film as in claim 4 wherein the mono-olefinic monomer is an alkyl acrylate.

6. A heat-shrinkable polyethylene terephthalate film as in claim 4 wherein the monoolefinic monomer is methyl acrylate.

7. A process for preparing a heat-sealable, substantially moisture-impermeable, heat-shrinkable polyethylene terephthalate film which comprises coating a heat-shrinkable base film of polyethylene terephthalate with a copolymer obtained from at least 80% by weight of vinylidene chloride and up to 20% by weight of at least one other polymerizable mono-olefinic monomer copolymerizable therewith, and drying the coated film.

8. A process as in claim 7 wherein the mono-olefinic monomer is an alkyl acrylate.

9. A process as in claim 7 wherein the mono-olefinic monomer is methyl acrylate.

10. A process as in claim 7 wherein the copolymer is applied from an organic solvent.

11. A process as in claim 7 wherein the copolymer is applied from an aqueous dispersion.

12. A process as in claim 7 wherein the coating solution is maintained at a temperature not exceeding 70° C.

13. A process as in claim 7 wherein the coated film is dried at a temperature below 70° C.

14. A process for preparing a heat-sealable, substantially moisture-impermeable, heat-shrinkable polyethylene terephthalate film which comprises coating a heat-shrinkable base film of polyethylene terephthalate with a copolymer obtained from at least 90% by weight of vinylidene chloride and up to 10% by weight of at least one other polymerizable mono-olefinic monomer copolymerizable therewith, and drying the coated film.

No references cited.